United States Patent [19]

Seki et al.

[11] 4,169,182
[45] Sep. 25, 1979

[54] HEAT INSULATING MATERIAL FOR HIGH TEMPERATURE USE AND PROCESS FOR MANUFACTURING THEREOF

[75] Inventors: Shigeru Seki, Nagoya; Toshio Kobayashi, Nishikasugai; Taketoshi Kato, Toyoda; Tsuguya Suzuki, Tokyo; Toshihiko Matsubara, Kawagoe, all of Japan

[73] Assignees: Honda Giken Kogyo Kabushiki Kaisha, Tokyo; Ishizuka Carasu Kabushiki Kaisha, Nagova, both of Japan

[21] Appl. No.: 688,481

[22] Filed: May 20, 1976

[30] Foreign Application Priority Data

May 24, 1975 [JP] Japan ................................. 50-61470

[51] Int. Cl.² ............................................. D04H 1/58
[52] U.S. Cl. ..................................... 428/288; 65/3 R; 65/33; 428/280; 428/296; 428/388; 428/432; 428/444; 428/457

[58] Field of Search ............... 156/62.4; 428/209, 280, 428/281, 284, 285, 329, 330, 379, 381, 384, 388, 432, 434, 444, 457, 296; 65/32, 33, 3 R

[56] References Cited

U.S. PATENT DOCUMENTS

| | | | |
|---|---|---|---|
| 3,464,806 | 9/1969 | Seki et al. | 65/32 |
| 3,790,360 | 2/1974 | Kato | 65/32 |
| 3,802,892 | 4/1974 | Pirooz | 65/32 |
| 3,876,407 | 4/1975 | Horose et al. | 65/32 |
| 3,892,904 | 7/1975 | Tanaka | 428/209 |
| 3,914,517 | 10/1975 | Pirooz | 65/32 |

*Primary Examiner*—James J. Bell
*Attorney, Agent, or Firm*—Haseltine, Lake & Waters

[57] ABSTRACT

Heat insulating materials having excellent heat resistance and durability prepared from glass-ceramic fibers composed chiefly of crystals, e.g., $\beta$-spodumene and/or cordierite and containing 0.1 to 15% by weight of at least one metallic element capable of absorbing radiant heat energy, e.g., Cu, Co, Fe, Ni, Cr, Mn, Mg. The metallic element may be in the form of the metal or an oxide thereof and may be present as a film or coating on the fibers.

4 Claims, 3 Drawing Figures

HEAT INSULATING MATERIAL FOR HIGH TEMPERATURE USE AND PROCESS FOR MANUFACTURING THEREOF

This invention relates to a heat insulating material for high temperature use, especially to preserve adiabatic conditions, which exhibits excellent heat resistance and also exhibits such excellent durability that its bulk density remains unchanged even when subjected to vibrations under such unfavorable conditions as high temperature and high humidity, and which can maintain its heat insulating property stably for a long period of time.

BACKGROUND OF THE INVENTION

Fibriform heat insulating materials have in the past included various organic heat insulating materials made of animal hairs, vegetable fibers, synthetic fibers, etc. and various inorganic heat insulating materials of glass fibers, asbestos, rock wool, ceramic fibers, carbon fibers, etc. Particularly, heat insulating materials for use at high temperatures have included inorganic heat insulating materials; however, they have not yet been fully satisfactory under certain application conditions.

For example, glass fibers begin to lose their strength at approximately 400° C. and asbestos is dehydrated and becomes brittle at approximately 550° C. And, as for rock wool and ceramics fibers, for instance, "KAO-WOOL" (trade name), for example they are changed in their crystalline nature or are devitrified to become brittle, above about 800° C., so that they can no longer maintain their heat insulating property when subjected to vibrations. Although the ceramic fibers of alumina, zirconia, or the like are used for the special application at superhigh temperatures, processes for their manufacturing are complicated so that it is difficult to make them in large quantities and they become very expensive products. And, as for carbon fibers, if exposed to high temperatures of approximately 400° to 500° C. or higher, they are oxidized and lose weight, so that the heat insulating property thereof cannot be maintained, and in addition, they are highly expensive.

Thus, none of these heat insulating materials is acceptable as one which is capable of maintaining a stable heat insulating property for a long time when applied to an outer shell, a flue, a steam pipe of an exhaust pipe, etc., of such arrangements which are to be subjected to high temperatures and vibrations as boilers, internal combustion engines, turbines, etc.

SUMMARY OF THE INVENTION

As a result of repeated research with the object of overcoming the foregoing disadvantages of the conventional heat insulating materials, the inventors have taken note of the fact that for insulating the heat emitted from a heat source at high temperature, it is of great significance to prevent the conduction of radiant heat, and they have found that heat insulating materials made of special glass-ceramic fibers containing a substance which absorbs radiant heat energy can maintain a highly stable heat insulating property under various application conditions.

The first object of this invention is to provide a heat insulating material which is capable of providing excellent heat resistance for a long period of time even at high temperatures of, for instance, 800° to 1200° C., of sufficiently withstanding mechanical stresses such as vibrations, impact, etc., and of preserving its strength for a long time.

The second object of this invention is to provide a heat insulating material which is capable of absorbing radiant heat energy from a heat source at high temperatures of 200° to 1200° C. to prevent the thermal conduction caused by passing the radiant heat therethrough, and of accumulating the absorbed heat energy in the vicinity of the heat source to increase its warmth keeping effect.

The third object of this invention is to provide a simple method of making a heat insulating material having the aforementioned characteristic properties.

And, an additional object of this invention is to provide a heat insulating material which is capable of meeting the above objects and of decreasing the size and weight of the heat insulating apparatus as a whole.

Thus, this invention relates to a heat insulating material for high temperature use made of special glass-ceramic fibers containing any desired radiant heat energy absorbing substance that is almost the same in weight as the conventional heat insulating materials made of glass fibers, asbestos, or ceramic-fibers, that can be formed into felt, blanket, bulk, sheet, paper, board or blank forms, and exhibits excellent heat insulating and vibration-proof properties against vibration at high temperatures and exhibits, in the formation thereof, a high self-supporting property maintaining its bulk density for a long period of time, and also provides a skeletal structure by itself.

DETAILED DESCRIPTION OF THE INVENTION

Figure 1:
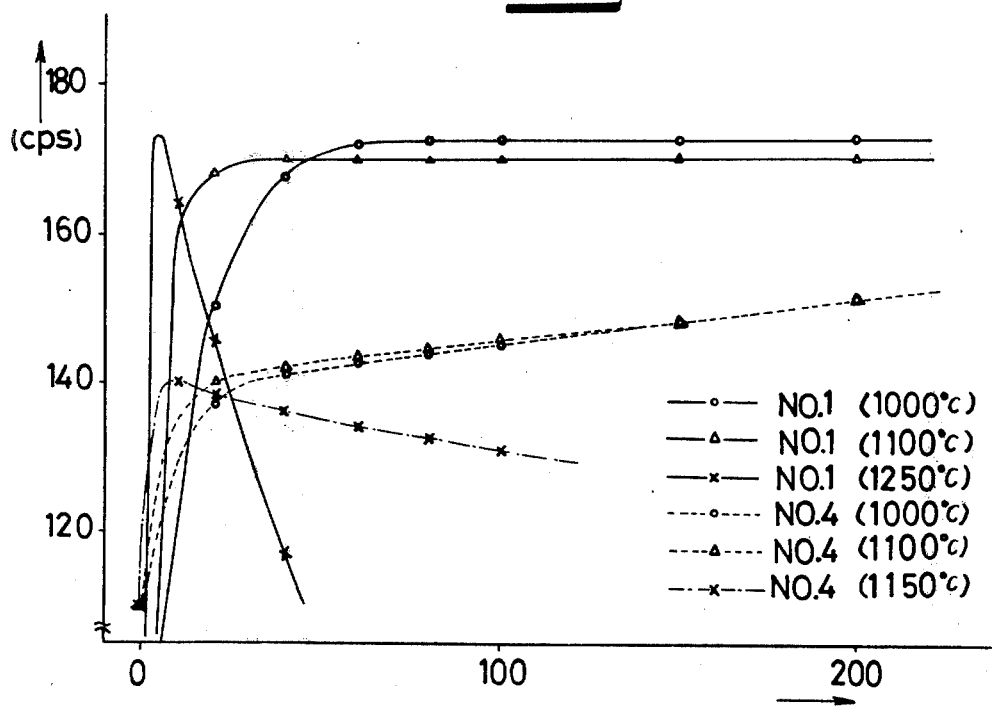
FIG. 1 is a graph showing the stability of heat insulating fiber formations.

Heat insulating materials consisting of formations of inorganic fibers have already been known. However, among such known ones, those of glass fibers and of ceramic-fibers are particularly effective in preventing heat loss caused by heat conduction or convection, but they are not yet satisfactory as heat insulating materials because they are pervious to the radiant heat energy emitted from a heat source at high temperatures. This invention has improved remarkably the heat insulating effect of the heat insulating materials by either incorporating in the fibrous materials a substance that absorbs the radiant heat energy or coating the surface thereof with a film of such a substance, so that they can absorb and accumulate therein the radiant heat energy.

Effective substances for absorbing radiant heat energy are metals such as Cu, Co, Fe, Cr, Mn and Ni, and the foregoing effects can be obtained either by mixing in the glass raw materials for glass-ceramics any of those metals or their compounds such as oxides, etc., and thereafter forming the mixture into fibers, or by forming a coating film of such metals or metal oxides on the surface of the fibers obtained after the glass raw materials are formed into fibers or after the fibers are formed into a felt, blanket or the like, by any means such as depositing such metals or metal oxides thereon, or the like.

In general, manufacturing thereof in accordance with the following steps can provide homogeneous products and is economically advantageous:

(1) melting a batch of raw materials for glass which contains one or more of the above metals or metallic compounds and is capable of crystallizing, (2) said metallic compound being used in an amount corresponding to 0.1 to 15 wt % thereof, calculated in terms of the oxide thereof, (3) forming the molten glass into fibers in accordance with any conventional methods, (4) forming the glass fibers into a product such as a felt, blanket, bulk, sheet, paper, board, blank, etc., and (5) heating the above product.

By this treatment, the glass fibers are converted into glass-ceramic fibers in such a manner that the matrix glass in which the metallic ions are present is formed into predetermined crystallite substances.

For this invention, it is essential to incorporate into the glass-ceramic fibers an appropriate amount of any of the metals Cu, Co, Fe, Cr, Mn and Mg. It has been confirmed that any of these metals is present as ions in the matrix glass and exhibits a geometrical effect, in the radiant heat energy absorption, with the radiant heat energy absorbing effect of the crystallites, and also exhibits an excellent effect in preventing the fibrous structure from changing due to high temperatures. Each of the metals as essential ingredient is used in the range of 0.1 to 15 wt %, calculated in terms of its oxide, and the optimum amount of each metal is shown below:

| | |
|---|---|
| CuO: 1 to 10% | MnO: 0.5 to 12% |
| $Fe_2O_3$: 0.1 to 10% | NiO: 0.1 to 8% |
| $Cr_2O_3$: 0.5 to 5% | CoO: 0.1 to 10% |

Two or more of these metals may be used as an admixture.

If the content thereof is less than 0.1%, it is difficult to effect the desired absorption of radiant heat energy and to prevent sufficiently the fibrous structure from changing due to high temperatures. If the content exceeds 15%, it is difficult to produce a sufficient amount of crystallites uniformly, and considerable reduction in the heat resistance and strength of the fibers results. The optimum amounts for improving stably or reliably the radiant heat absorption property and the heat resisting property, are slightly different individually depending on the kinds of metals as shown above.

Crystalline substances of the glass-ceramic fibers may be properly selected in compliance with the temperatures and locations at which the adiabatic materials are used. For instance, it is very advantageous for use in locations requiring rapid heating and cooling, that the glass-ceramic fibers be chiefly composed of a $\beta$-spodumene crystals of the $Li_2O-Al_2O_3-SiO_2$ system which has a small thermal expansion coefficient and that for use in locations always subjected to high temperatures, glass-ceramic fibers mainly composed of cordierite crystals of the $MgO-Al_2O_3-SiO_2$ system be used. Further, where both the foregoing characteristic properties are required, glass-ceramic fibers of $Li_2O-MO-Al_2O_3-SiO_2$ (MO: oxides of divalent metals) including the crystalline substances of $\beta$-spodumene, cordierite and others are effective. Known agents for forming crystalline nuclei are used, such as $TiO_2$, $ZrO_2$, $P_2O_5$, F, etc., singly or in combination in accordance with conventional methods. $K_2O$, $Na_2O$, $B_2O_3$, etc., may be present to such an extent as not to adversely affect the various properties.

Actual contents of the foregoing ingredients in embodiments of this invention are shown below:

For the $Li_2O-Al_2O_3SiO_2$ system:
$Li_2O$: 1 to 15 wt %
$Al_2O_3$: 12 to 40 wt %
$SiO_2$: 55 to 75 wt %
Nucleating agent: 1 to 15 wt %

For the $MgO-Al_2O_3-SiO_2$ system:
MgO: 8 to 18 wt %
$Al_2O_3$: 10 to 35 wt %
$SiO_2$: 40 to 68 wt %
Nucleating agent: 5 to 15 wt %

For the $Li_2O-MO-Al_2O_3-SiO_2$ system:
$Li_2O$: 1 to 15 wt %
MO: 5 to 25 wt %
$Al_2O_3$: 2 to 35 wt %
$SiO_2$: 37 to 65 wt %
Nucleating agent: 1 to 15 wt %

When left under high temperatures, crystallization of conventional glass-ceramic fibers proceeds and eventually they become brittle, but the glass-ceramic fibers containing metals in accordance with this invention exhibit high stability of crystallites under high temperatures.

Furthermore, when the glass-ceramic fibers are coated with a film of said metals or their oxides, they are further improved in heat resistance and are no longer fragile, while at the same time they are improved in radiant heat energy absorption.

If copper is used as the incorporated metal, during heat treatment for crystallization before or after forming the fibers into any product such as a non-woven sheet or the like, metallic copper is, quite conveniently, precipitated on the surface of the fibers, so that the external layer comprising copper or copper oxide is formed on the surface of the fibers. Where other metals are used, the external layer comprising these metals is formed by means of evaporation deposition and the like.

The heat insulating materials in accordance with this invention also have the following advantages:

Usually, when inorganic fibers of glass, etc. are formed into a felt, blanket, sheet, etc., having a specific bulk density, a bonding agent is required to bond the fibers together. Organic bonding agents commonly available have the disadvantage that they cannot withstand high temperature use and even at low temperature are corroded by alkali exuding from the fibers when humidity is high and therefore their bonding effect is easily lost and they are unable to maintain the bulk density of the product.

A product made from the glass-ceramic fibers in accordance with this invention is obtained by forming the glass-ceramic fibers immediately after forming the glass material into fibers and then heating the same, and thus they can be obtained without requiring any bonding agent, and accordingly they become free of the aforementioned disadvantages.

If glass-ceramic fibers are coated with a metallic layer, and thereafter are formed into a product, the metallic layers of the adjacent fibers are melted and adhere to each other simply by properly putting the fibers in a mold, heating and pressing, and therefore a product of a heat insulating material having any desired necessary bulk density can easily be obtained.

The process of manufacturing the heat insulating material of this invention starts with compounding the raw materials containing the foregoing metals or metallic compounds and other raw materials such as silicates, alumina, lithia, magnesia, and nucleating agents, in accordance with any conventional techniques and is followed by the subsequent steps mentioned below:

A batch of the compounded raw materials thus obtained is charged into a furnace and is melted at a temperature of approximately 1400° to 1650° C. to become homogeneous molten glass, which is then formed into fibers in accordance with any conventional manner of making glass fibers. Thereafter, the resultant glass fibers are formed into any product such as a felt, blanket, bulk, sheet, paper, board, etc., depending on various applications. The formations are then subjected to heat treatment under the respective conditions necessary for crystallization suited to their glass compositions. For example, glass fibers of the $Li_2O$—$Al_2O_3$—$SiO_2$ system composition are heated at the rate of approximately 5° C./min and are kept for 20 to 90 minutes at a temperature of approximately 800° to 950° C. And, glass fibers of the $MgO$—$Al_2O_3$—$SiO_2$ system composition are heated at the same rate as above and are kept for 20 to 90 minutes at a temperature of approximately 850° to 1000° C. If necessary, prior to said heat treatments, the fibers may be subjected to heat treatment for producing crystal nuclei (600° to 800° C., for 20 to 60 mins.) If copper is used as the metal to be incorporated and when such a heat treatment is carried out under a reducing atmosphere of hydrogen, carbon monoxide, etc., the metallic copper precipitates on the surface of the glass-ceramics fiber, as described before. When the heat treatment is carried out in an oxidizing atmosphere, such as air, the oxide of copper precipitates, while a part thereof is given off by sublimation. Needless to say, it is not intended that this invention include such heat treatment conditions as a requirement.

Glass compositions capable of crystallizing shown in Tables 1 and 2 were obtained by compounding and melting the respective raw materials by any conventional means. From the resultant melted glass compositions, glass fibers were manufactured by conventional methods. Thereafter, they were formed into a felt product which was subjected to heat treatment.

Table 1

| No. | 1 | 2 | 3 | 4 | 5 |
|---|---|---|---|---|---|
| Glass Composition $Li_2O$ | 3.5 | | | | |
| $Al_2O_3$ | 21.0 | | | | |
| $SiO_2$ | 67.2 | | | | |
| MgO | 1.5 | | | | |
| $ZrO_2$ | 2.3 | | | | |
| F | 2.7 | | | | |
| $TiO_2$ | 1.8 | | | | |
| $Fe_2O_3$ | 8.0 | | | | |
| CoO | | 2.0 | | | |
| NiO | | | 4.0 | | |
| $Cr_2O_3$ | | | | 2.0 | |
| MnO | | | | | 10.0 |

Table 2

| No. | 1 | 2 | 3 | 4 |
|---|---|---|---|---|
| Glass Composition $SiO_2$ | 62.0 | 51.0 | 57.8 | 66.0 |
| $Al_2O_3$ | 24.0 | 23.0 | 11.9 | 25.5 |
| $Li_2O$ | 3.5 | | 2.1 | 3.7 |
| MgO | | 15.0 | 8.3 | |
| CaO | | | 2.1 | |
| $TiO_2$ | 4.5 | 4.5 | 2.0 | 4.8 |
| $ZrO_2$ | | | 3.0 | |
| F | | | 5.2 | |
| $As_2O_3$ | | 1.5 | | |
| $K_2O$ | | | 1.6 | |
| CuO | 6.0 | 5.0 | 6.0 | |

In the embodiments shown in Table 2, said felt products were subjected in a current of hydrogen to the specific heat treatments necessary for crystallization of said glasses: No. 1 and No. 4 were heated at the rate of temperature rise of 5° C./min and kept for 60 minutes at a temperature of 900° C. No. 2 and No. 3 were heated at the same rate of temperature rise and kept for 60 minutes at 970° C. and for 112 minutes at 930° C., respectively. On the surface of the No. 1, No. 2 and No. 3 felt product thus obtained, metallic copper was precipitated to give the appearance of products of copper fibers. No. 4 is shown for comparison purpose and contains no copper.

In Table 3, the nature and properties of the products (heat insulating materials) in the form of felt are indicated.

Table 3

| No. | 1 | 2 | 3 | 4 |
|---|---|---|---|---|
| Bulk Density (g/cm³) | 0.12 | 0.25 | 0.21 | 0.11 |
| Heat Insulating Material Thickness (cm) | 1 | 1 | 1 | 1 |
| Average Fiber Thickness (n) | 3 | 3 | 3 | 3 |
| Resistance to Heat at Temperature (°C) | 1100 | 1150 | 1100 | below 900 |
| Main Crystallites of Fibers | $Li_2O$—$Al_2O_3$—$4SiO_2$ | $2MgO$—$2Al_2O_3$—$5SiO_2$ | $Li_2O$—$Al_2O_3$—$4SiO_2$ | $Li_2O$—$Al_2O_3$—$4SiO_2$ |

FIG. 1 shows the stability of each group of fibers under high temperatures. It is understood therefrom that No. 1 undergoes no change in the crystalline amount at a temperature of 1100° C., whereas No. 4 undergoes a remarkable change in the crystalline amount at the same temperature. The crystalline amounts (relative ratios) in FIG. 1 show those converted from the CPS values obtained by X-ray diffraction of the main crystalline substances.

Figure 2:
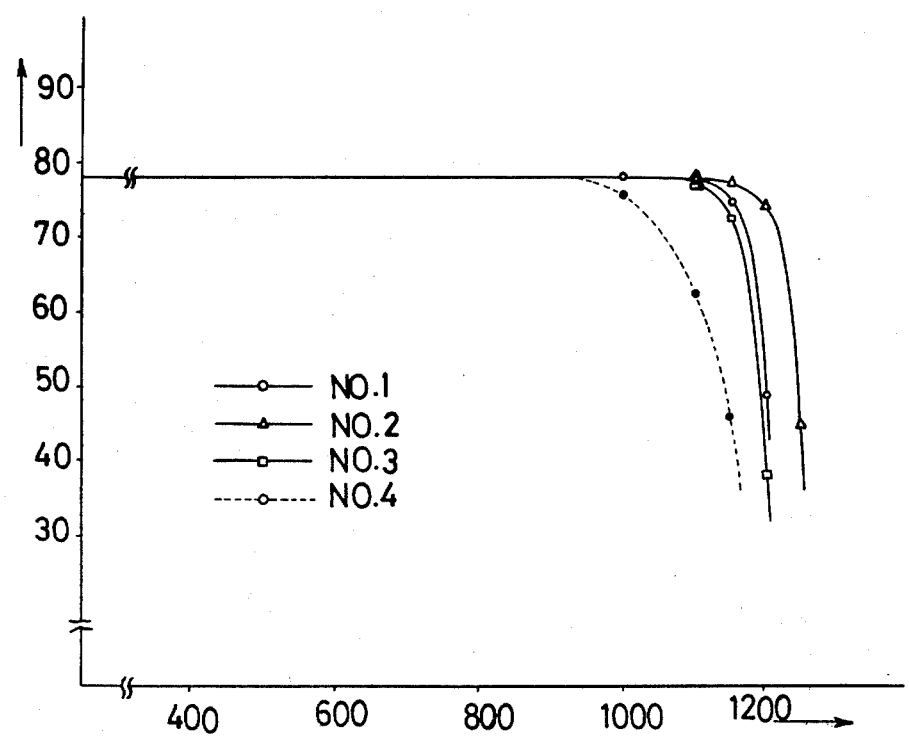
FIG. 2 is a graph showing the toughness of heat insulating fiber formations.

FIG. 2 shows the toughness of the heat insulating materials under high temperatures. The recovery rate is represented by (compressed thickness/initial thickness) × 100% where the samples have been compressed to 1/5 of the initial thickness under respective temperatures. It can be seen that No. 2 has excellent toughness under a high temperature (1200° C.).

Figure 3:
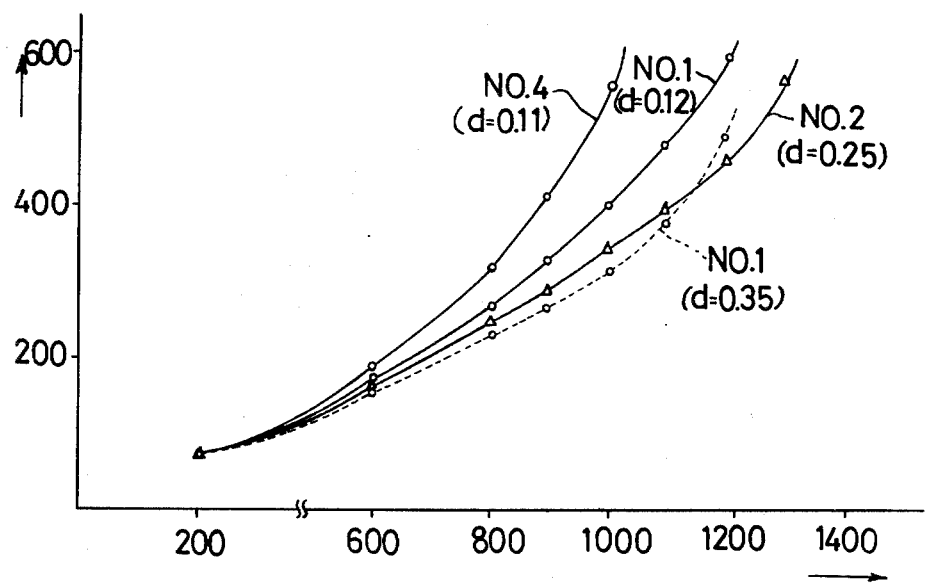
FIG. 3 is a graph showing the heat insulating property of fiber formations.

FIG. 3 shows the heat insulating properties of the produced heat insulating materials. The graph shows the relation between the temperature at the face (I) of the each of the heat insulating materials with the respective bulk densities (d), on the horizontal axis and the temperature at the opposite face (II) of each of the same heat insulating materials on the vertical axis.

As described above in detail, heat insulating materials for high temperature use in accordance with this invention are capable of maintaining stably their heat insulating property for a long time against high temperatures and vibrations, and offer an efficient heat insulating property for heat insulating materials with small thickness, and can make the heat insulating system small and light and make a great contribution to the industry.

What we claim is:

1. A process for manufacturing a heat insulating material for high temperature use which comprises (1) preparing and melting a batch of glass raw materials which is capable of crystallizing and is mixed with powders of copper or a copper compound in an amount equivalent to 0.1 to 15% by weight, calculated in terms of CuO, (2) forming the molten glass into fibers, (3) forming said glass fibers into a mat product and (4) heating the mat product in a reducing atmosphere under conditions necessary for crystallizing the glass fibers whereby a layer of metallic copper is formed on the surfaces of said fibers and said layers melt causing adjacent fibers to adhere to each other and wherein the mat product has a bulk density of from 0.12 to 0.25 g/cm$^3$.

2. A process for manufacturing a heat insulating material for high temperature use which comprises (1) preparing and melting a batch of glass raw materials which is capable of crystallizing and is mixed with powders of copper or a copper compound in an amount equivalent to 0.1 to 15% by weight, calculated in terms of CuO, (2) forming the molten glass into fibers, (3) forming said glass fibers into a mat product and (4) heating the mat product in an oxidizing atmosphere under conditions necessary for crystallizing the glass fibers whereby a layer of copper oxide is formed on the surfaces of said fibers and said layers melt causing adjacent fibers to adhere to each other and wherein the mat product has a bulk density of from 0.12 to 0.25 g/cm$^3$.

3. The product obtained by the process of claim 1.

4. The product obtained by the process of claim 2.

* * * * *